Sept. 29, 1959 K. L. WERNSING ET AL 2,905,993
CHOKER HOOK
Filed Feb. 25, 1957 2 Sheets-Sheet 1
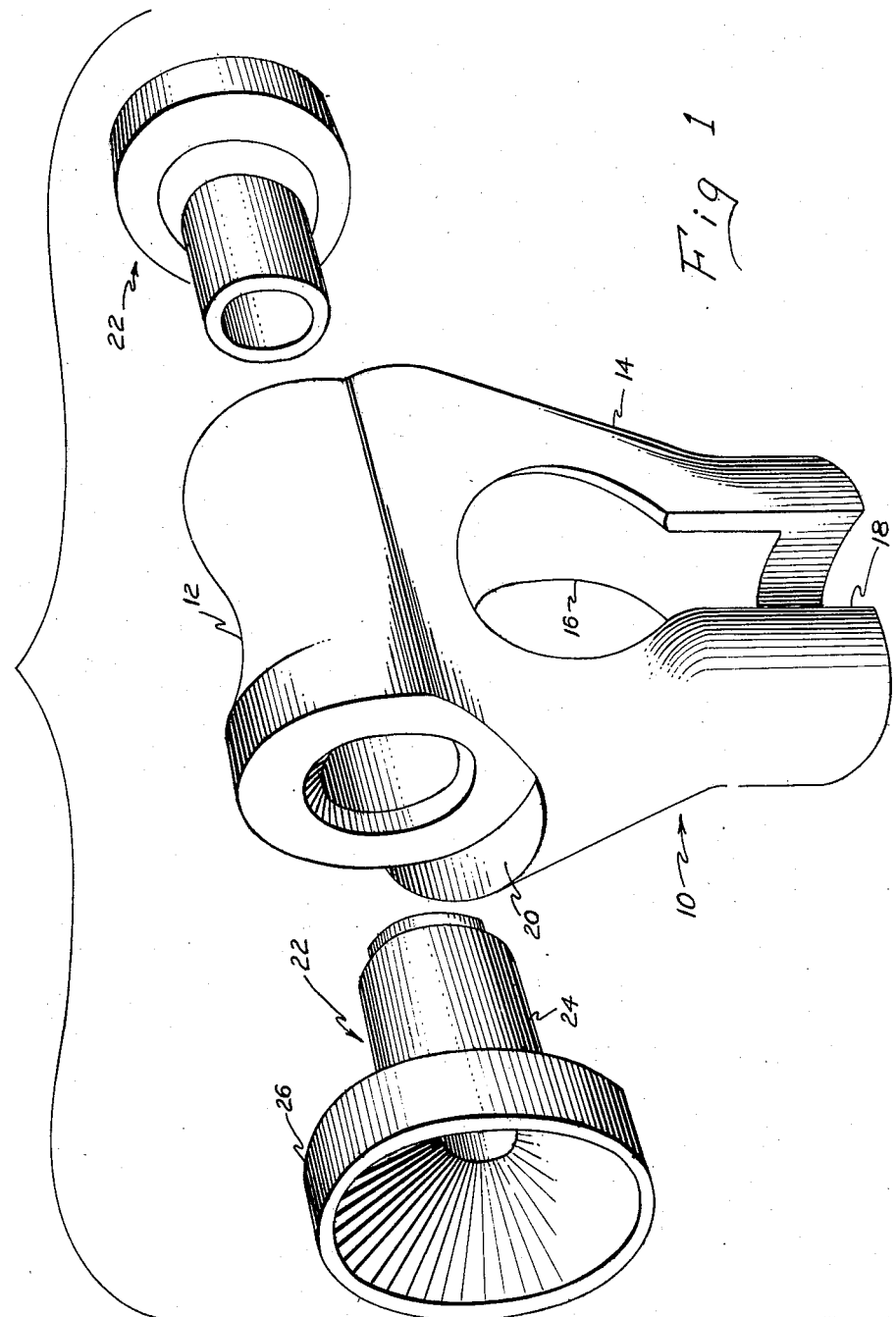
INVENTOR.
KENNETH L. WERNSING
KENNETH N. WALROD
BY
ATT'Y Sept. 29, 1959　　　K. L. WERNSING ET AL　　　2,905,993
CHOKER HOOK
Filed Feb. 25, 1957　　　　　　　　　　2 Sheets-Sheet 2
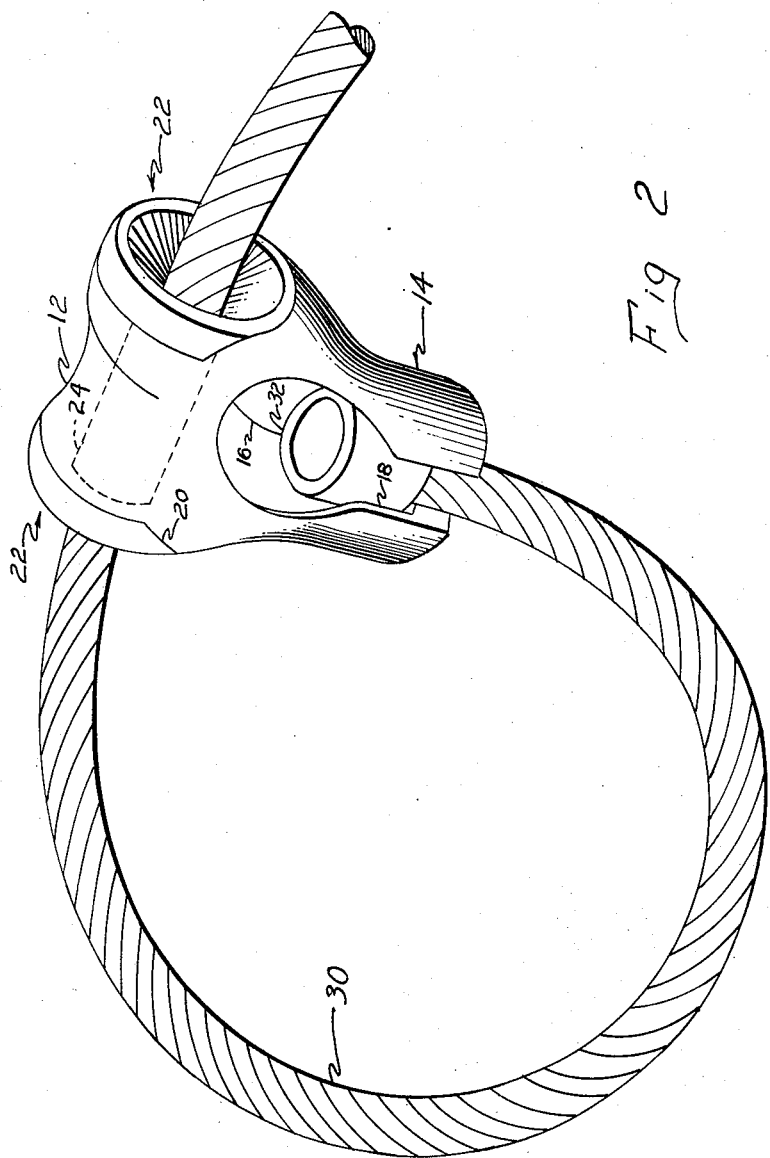
INVENTOR.
KENNETH　L.　WERNSING
KENNETH　N.　WALROD
BY
　　　　ATT'Y

United States Patent Office 2,905,993
Patented Sept. 29, 1959

2,905,993

CHOKER HOOK

Kenneth L. Wernsing and Kenneth Neal Walrod, Portland, Oreg.

Application February 25, 1957, Serial No. 642,150

6 Claims. (Cl. 24—123)

This invention relates to choker hooks for use on log hauling cables.

In logging, it is conventional practice to provide a choker line having an eye at one of its ends and a ferrule at the other. A choker hook is slidably mounted intermediate the ends of the line. It includes a slip sleeve through which the eye passes and a socket in which the ferrule may removably be seated. Accordingly the end of the line provided with the ferrule may be wrapped around the end of a log, the ferrule seated in the socket, and the eye at the other end of the line attached to a donkey or tractor and drawn taut. Thereupon the loop about the log draws tight and the log may be dragged to the location of the donkey, or towed by the tractor.

Two difficulties are inherent in the use of such a choker line. First, it is difficult to remove the ferrule from the choker hook at the conclusion of the log hauling operation because the hook and ferrule are embedded deeply in the bark of the log. Second, because of the great stresses involved and the variable hauling angles, the cables are severely worn by rubbing contact with the edges of the choker hook through which they are passed.

It accordingly is the general object of the present invention to provide a choker hook which reduces the wear factor on cables with which it is used, and from which the ferrule may readily be removed at the conclusion of a log hauling sequence.

The manner in which the foregoing and other objects of this invention are accomplished will be apparent from the accompanying specification and claims considered together with the drawings, wherein:

Fig. 1 is a perspective exploded view of the presently described choker hook; and Fig. 2 is a perspective view of the choker hook of Fig. 1 illustrated in its application to a ferrule-equipped log hauling cable or choker line.

Generally stated, the presently described choker hook comprises a slip sleeve, liners rotatably mounted one in each end of the slip sleeve, and a socket piece connected to the slip sleeve and adapted to receive a ferrule. Accordingly when the choker hook is used, the liners turn with the cable so rubbing contact is substantially absent. Also, when it is desired to release the choker hook, the body of the hook may be rotated about the liner, which remains stationary, until the slot in the socket piece is exposed so that the ferrule may be removed.

Considering the foregoing in greater detail and with particular reference to the drawings:

As is apparent from Fig. 1, the choker hook of our invention indicated generally at 10 includes a slip sleeve 12 having a longitudinal opening therethrough and a socket piece 14. The socket piece is hollow and provided with a transverse opening 16 and a longitudinal slot 18 which extends substantially at right angles to the bore of slip sleeve 12. The opening in the socket piece communicates with the passageway through the slip sleeve for a purpose which will appear hereinafter.

The outer side faces of the slip sleeve are formed with arcuate, square shoulders 20 which are concentric with the axis of the bore of the sleeve. Each of these shoulders is dimensioned to seat a liner indicated generally at 22.

The liners are substantially identical in construction and each includes a shank portion 24 and an enlarged head portion 26. The opening through the liner is flared or belled outwardly in the illustrated manner.

The periphery of the head 26 of the liner is adapted to seat in shoulder 20 and shank 24 is dimensioned for a freely rotating fit in the opening through the slip sleeve. The inner end of the shank portion of one of the liners, however, is countersunk to receive the inner end of the companion liner.

Hence the liners may be inserted in the slip sleeve until their outer portions seat in the adjacent shoulders and their inner ends interfit. The latter then may be welded together, working through the opening 16 in the socket piece. In this manner there is provided a choker hook assembly having a rotatable sleeve through which the choker line may be passed.

The application of the described choker hook is illustrated in Fig. 2. As indicated, the choker line 30 is passed through the slip sleeve of the choker hook, looped around a log and the ferrule 32 at the end of the line inserted in socket piece 14. The free end of the line then may be connected to a donkey or tractor and the log towed away in the usual manner.

During the towing operation, the wear on the cable is minimized first, because of the outwardly flared contour of liners 22 and secondly, because the liner turns freely within the choker hook. Then, when it is desired to release the choker line from the log, the choker hook may be rotated about the liner until slot 18 in the socket piece is exposed. Thereupon the ferrule may be readily extricated and the line applied to hauling another log.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A choker hook for receiving a cable having a ferrule at its end, comprising: a slip sleeve, a liner rotatably mounted in the slip sleeve, a head portion on the liner projecting beyond one end of the sleeve, and a socket piece connected to the slip sleeve and adapted to receive the ferrule.

2. A choker hook for receiving a cable having a ferrule on its end, comprising: a slip sleeve formed with a shoulder adjacent one end thereof, a liner dimensioned to be mounted rotatably within the slip sleeve, an enlarged head portion on one end of the liner rotatably seated on the shoulder, and a slotted socket piece integral with the slip sleeve and extending substantially at right angles thereto for receiving the ferrule.

3. The choker hook of claim 2 wherein a shoulder is formed adjacent each end of the sleeve and the liner comprises a pair of parts each including a hollow shank portion dimensioned to be inserted in the sleeve and an integral, outwardly flared head portion rotatably seated on the shoulders, the liner parts being interconnected internally of the sleeve.

4. A choker hook for receiving a cable having a ferrule at its end, comprising a sleeve portion, a liner rotatably mounted in the sleeve, enlarged head portions on opposite ends of the liner projecting beyond the ends of the sleeve, and a socket portion adapted to receive the ferrule.

5. A choker hook for receiving a cable having a ferrule at its end, comprising a sleeve portion, a liner rotatably mounted in the sleeve, said liner comprising a pair of parts extending inwardly from opposite ends of the sleeve and being interconnected internally of the sleeve, enlarged head portions on opposite ends of the liner projecting beyond the ends of the sleeve, and a socket portion adapted to receive the ferrule.

6. A choker hook for receiving a cable having a ferrule on its end, comprising a sleeve portion, a liner dimensioned to be rotatably mounted in the sleeve portion and adapted to receive a cable, the liner being formed from a pair of parts each including a hollow shank portion, the liner parts being adapted to be interconnected internally of the sleeve, said sleeve portion having a lateral opening communicating with the interior thereof for access to such interior for interconnecting the pair of liner parts together after insertion thereof in the sleeve, and socket means integral with the sleeve portion for receiving the ferrule.

References Cited in the file of this patent
UNITED STATES PATENTS

| | | |
|---|---|---|
| 1,669,152 | Yeaton | May 8, 1928 |
| 1,923,263 | Heddon | Aug. 22, 1933 |